United States Patent

Smith

[11] Patent Number: 5,721,598
[45] Date of Patent: Feb. 24, 1998

[54] HIGH EFFICIENCY, HIGH COLOR PURITY, ON-AXIS HOLOGRAPHIC COLOR FILTER AND FULL-COLOR LIQUID CRYSTAL DISPLAY

[75] Inventor: Ronald T. Smith, Corona Del Mar, Calif.

[73] Assignee: Hughes Electronics, Los Angeles, Calif.

[21] Appl. No.: 578,264

[22] Filed: Dec. 26, 1995

[51] Int. Cl.$^6$ .................... G02F 1/1335; G02B 5/32
[52] U.S. Cl. .................................. 349/106; 359/15
[58] Field of Search ............................ 359/40, 41, 68, 359/94, 95, 22, 15; 349/106, 5, 201, 200, 159

[56] References Cited

U.S. PATENT DOCUMENTS

| | | | |
|---|---|---|---|
| 4,798,448 | 1/1989 | van Raalte | 359/49 |
| 4,807,978 | 2/1989 | Grinberg et al. | 359/20 |
| 4,850,682 | 7/1989 | Gerritsen | 359/94 |
| 4,856,869 | 8/1989 | Sakata et al. | 359/94 |
| 4,960,314 | 10/1990 | Smith et al. | 359/15 |
| 4,981,332 | 1/1991 | Smith | 359/13 |
| 5,046,827 | 9/1991 | Frost et al. | 359/69 |
| 5,299,037 | 3/1994 | Sakata | 359/41 |
| 5,506,701 | 4/1996 | Ichikawa | 359/15 |
| 5,513,025 | 4/1996 | Watanabe et al. | 359/68 |

*Primary Examiner*—William L. Sikes
*Assistant Examiner*—Toan Ton
*Attorney, Agent, or Firm*—Leonard A. Alkov; Wanda K. Denson-Low

[57] ABSTRACT

A liquid crystal display comprising a four-layer holographic filter that projects up to 100 percent of incident white light while providing improved color purity. The four-layer holographic filter processes normal incidence collimated white light derived from a projector and focuses red, green, and blue components of the collimated white light into separate spatial locations of a liquid crystal layer. The four-layer holographic filter includes a large spectral bandwidth volume transmission grating layer that diffracts incident collimated white light off-axis, followed by an off-axis holographic color filter comprising three separate hologram layers that include an array of off-axis volume transmission hologram lenslets designed to diffract the respective blue, green and red components of the off-axis white light back on axis and focus them onto locations of blue, green and red pixels, respectively, of the liquid crystal display layer.

10 Claims, 3 Drawing Sheets

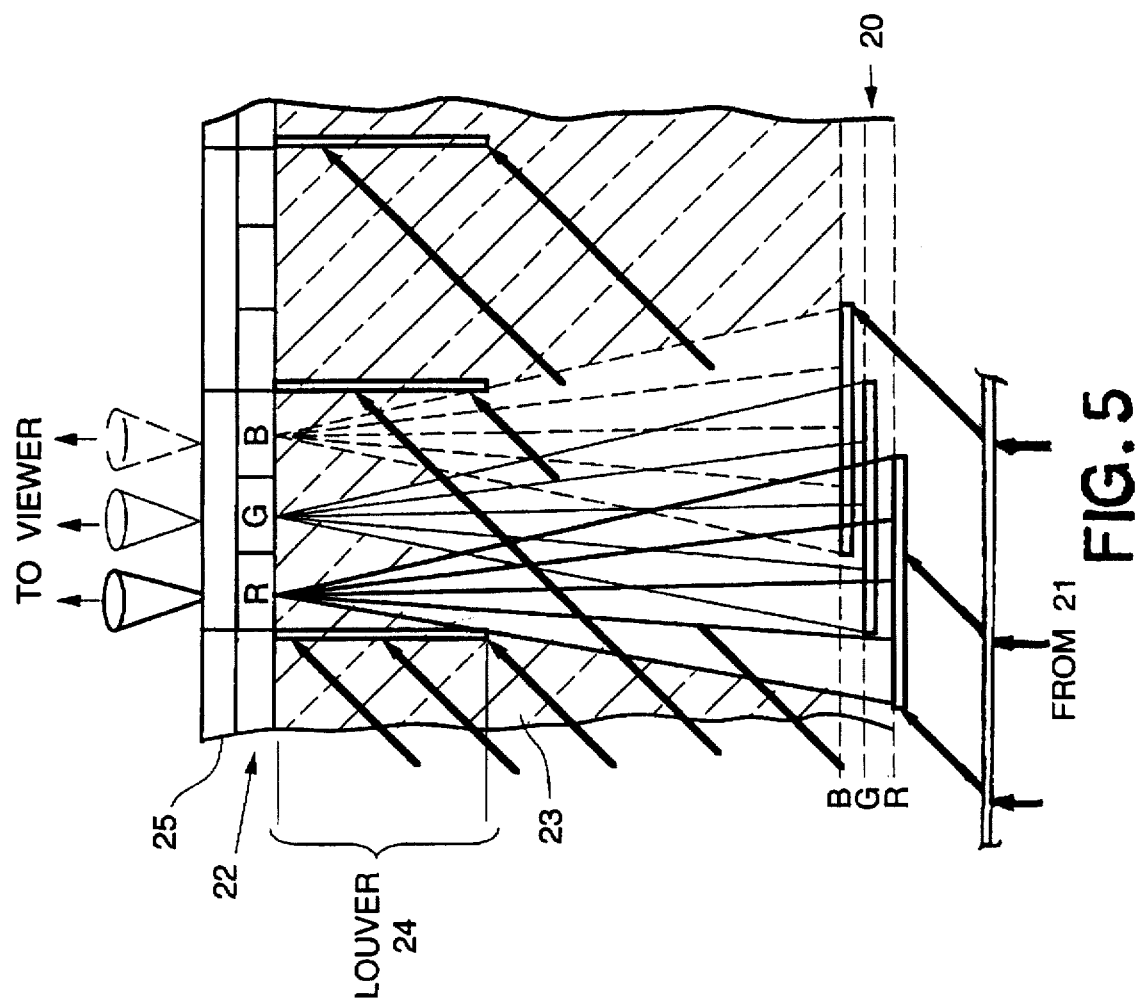

5,721,598

1

HIGH EFFICIENCY, HIGH COLOR PURITY, ON-AXIS HOLOGRAPHIC COLOR FILTER AND FULL-COLOR LIQUID CRYSTAL DISPLAY

CROSS REFERENCE TO RELATED PATENTS

The present invention is related to U.S. Pat. No. 4,807,978 entitled "Color Display Device and Method Using Holographic Lenses", assigned to the assignee of the present invention, the contents of which are incorporated herein by reference.

BACKGROUND

The present invention relates generally to liquid crystal displays, and more particularly, to a full-color liquid crystal display employing an on-axis holographic color filter.

Prior art related to the present invention includes U.S. Pat. No. 4,807,978 entitled "Color Display Device and Method Using Holographic Lenses", U.S. Pat. No. 4,960,314 entitled "Diffraction Optics Diffusing Screen Laminate for Full Color On-Axis Viewing", and U.S. Pat. No. 4,981,332 entitled "Dispersion-Compensated Windshield Hologram Virtual Image Display", all of which are assigned to the assignee of the present invention. U.S. Pat. Nos. 4,960,314 and 4,981,332 provide a detailed discussion of holographic dispersion compensation relating to image displays, which is useful in understanding the present invention.

A typical full-color liquid crystal display works by projecting a collimated beam of white light through a color filter and then a liquid crystal display module to provide a red/green/blue full-color image. This image may be viewed in transmission mode by focusing the transmitted image onto a screen or by placing a screen immediately after the liquid crystal display layer. It can also be viewed in reflection mode by disposing a mirror after the liquid crystal display, reflecting the light back through the liquid crystal display and color filter layers, passing the reflected light through a polarizing beamsplitter, and projecting the reflected image onto a screen for viewing. In each of these cases, the conventional color filter consists of an array of red, green, and blue-absorptive filters that are arranged to coincide with the spatial positions of the red, green, and blue information containing pixels of the liquid crystal display. The array pattern may consist of stripes, a honeycomb arrangement, or other pattern. For the device to work properly, the color filter must be carefully aligned with respect to the liquid crystal display layer.

A major disadvantage of the conventional red/green/blue absorptive filter is that it absorbs most of the light and uses only about 20% of the original white light. This is a problem, because in many full-color display applications, there is a need for increased display brightness. Therefore, there existed a need for a red/green/blue filter that is much more efficient than the conventional absorptive filter.

In response to that need, U.S. Pat. No. 4,807,978 assigned to the assignee of the present invention, discloses a liquid crystal display 10' employing an off-axis triple-layer holographic red/green/blue color filter 20 that improves upon the above-described conventional absorptive color filter. The liquid crystal display 10' disclosed in of U.S. Pat. No. 4,807,978 is shown in FIGS. 1 and 2. The liquid crystal display 10' comprises the triple-layer holographic red/green/blue color filter 20 which receives off-axis white light from a white light source 21 or projector 21. The triple-layer holographic color filter 20 is disposed on one surface of an optically-transmissive substrate 23. Red, green, and blue components of the white light are focused by three layers (R, B, G) of the triple-layer holographic color filter 20 into separate spatial locations corresponding to red, green, and blue information-containing pixels of a liquid crystal display layer 22 disposed on an opposite surface of the substrate 23. A plurality of louvers 24 are disposed within the substrate 23 that are used to help confine the red, green, and blue components of the white light to predetermined pixel locations of the liquid crystal display layer 22. A fiber optic faceplate 25 covers the liquid crystal display layer. The red, green, and blue components of the light are projected from an outer surface of the fiber optic faceplate for viewing by an observer. The triple-layer holographic color filter has the ability to use up to 100% of the input white light, which is a major improvement in efficiency over the conventional absorptive color filter.

However, providing off-axis illumination is very inconvenient and presents special problems, such as a difficulty in focusing a rectilinear image onto an off-axis surface. Therefore, there existed a desire to make a color filter work with on-axis light. U.S. Pat. No. 4,807,978 also discloses an embodiment of a liquid crystal display 10" employing a triple-layer holographic red/green/blue color filter 20 that uses on-axis light, illustrated in FIGS. 3 and 4. This embodiment of the liquid crystal display 10" is similar to the above-described display discussed with reference to FIGS. 1 and 2. However, an output lens 26 is disposed on the output surface of the fiber optic faceplate 25 and a second lens 27 is provided to image the light projected by the display 10".

However, holographic lenslets within the triple-layer holographic color filter 20 that are designed to receive on-axis light and focus it onto an on-axis point at the liquid crystal display layer 22 do not work as well as would be desired. This is because surface fringe spacing varies from about one micron at the edge of the lenslet to infinity at the center. While the edge of the lenslet behaves as a volume transmission hologram (having high diffraction efficiency into the first order, while effectively suppressing all higher orders), the center of the lenslet is effectively not a hologram, and is totally transparent to light. Between these regions is a region where the holographic lenslet acts a plane hologram that provides weak diffraction into the first order, substantial diffraction into higher orders, and substantial transmission of the zero-order beam. The overall effect is to degrade the total efficiency of the holographic color filter 20. The liquid crystal display 10" thus exhibits degraded color purity due to unwanted undiffracted light transmitted through the holographic filter 20.

Accordingly, it is an objective of the present invention to provide for an improved on-axis holographic color filter for use in a full-color liquid crystal displays that overcomes the limitations of the above-described color filters. It is a further objective of the present invention to provide for a full-color liquid crystal display employing the improved on-axis holographic color filter.

SUMMARY OF THE INVENTION

To meet the above and other objectives, the present invention provides for a flat panel liquid crystal display comprising a four-layer holographic filter that processes normal incidence white light derived from a white light source that produces collimated white light and focuses red, green, and blue components of the light into separate spatial locations of a liquid crystal display layer. The four-layer holographic filter includes a large spectral bandwidth volume transmission grating layer that diffracts incident collimated white light off-ms, and three separate hologram layers that include an array of off-axis volume transmission hologram lenslets designed to diffract the respective blue, green and red components of the off-axis white light back on axis and focus them onto locations of blue, green and red pixels, respectively, of the liquid crystal display layer.

The present invention is more advantageous than conventional absorptive red/green/blue filters because it projects up to 100% of the incident white light, compared to the absorptive red/green/blue filter which uses only about 20% of the incident white light. Therefore, a color display employing the present on-axis holographic red/green/blue filter is up to 5 times brighter than conventional displays. The present invention also improves over the display of U.S. Pat. No. 4,807,978 by providing a liquid crystal display that exhibits improved color purity.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 5 illustrates a cross sectional view of a liquid crystal display employing an improved holographic filter in accordance with the principles of the present invention.

DETAILED DESCRIPTION

Figure 2:
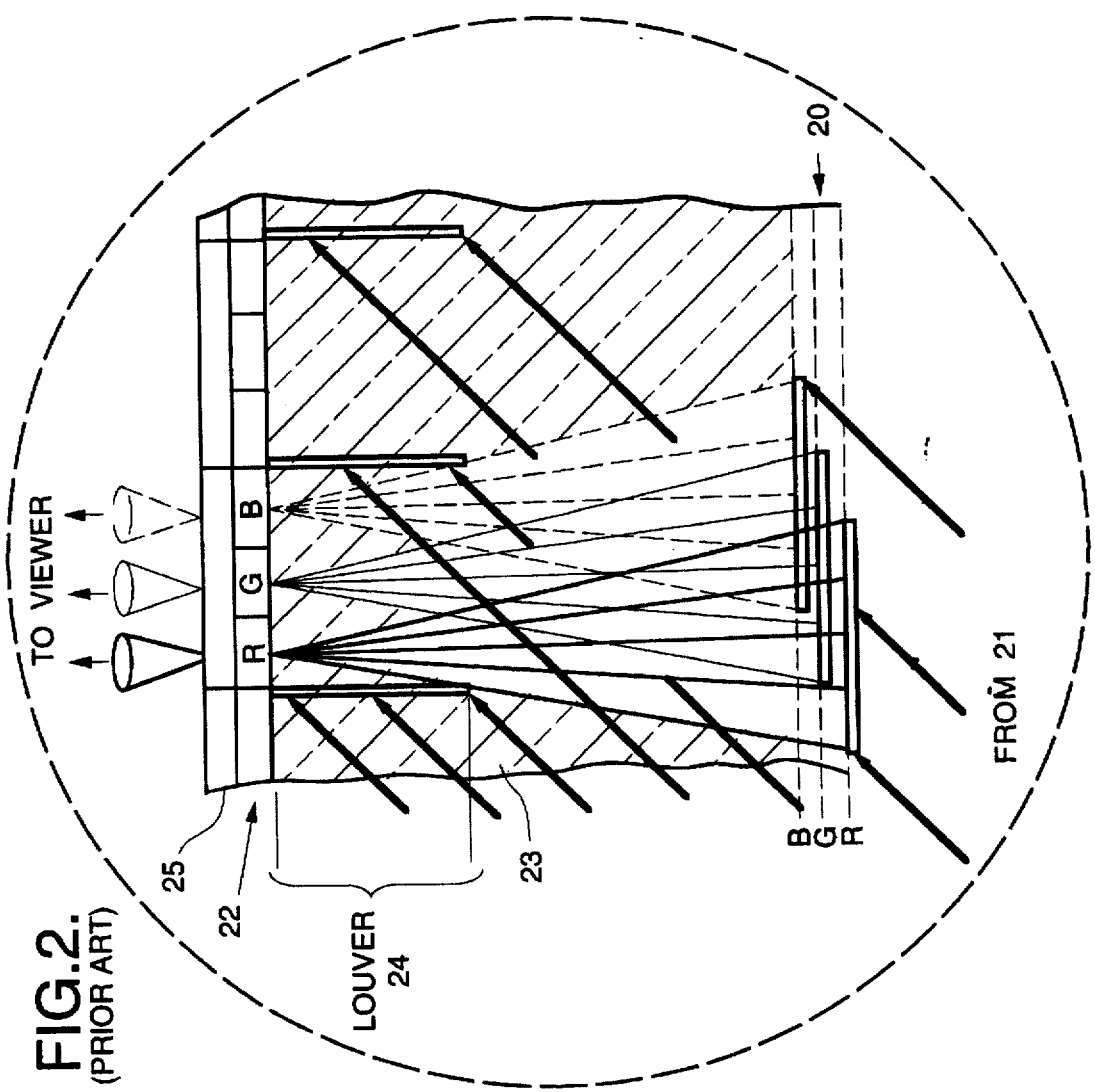
FIG. 2 illustrates an enlarged view of the encircled portion of the liquid crystal display of FIG. 1.

Referring to FIG. 5, it illustrates a cross sectional view of a liquid crystal display 10, or flat panel liquid crystal display 10, employing an improved holographic red/green/blue filter 30 in accordance with the principles of the present invention. The holographic red/green/blue filter 30 is designed to filter on-axis white light, provide near-100% utilization of the filtered white light, and produce a high color purity image.

The liquid crystal display 10 comprises the holographic red/green/blue filter 30 which receives on-axis white light from a white light source 21 or projector 21 that produces collimated white light. The holographic red/green/blue filter 30 is comprised of an off-axis triple-layer holographic color filter 20, such as is described in U.S. Pat. No. 4,807,978, and an off-axis volume transmission grating 31 disposed on an input surface of the off-axis holographic filter 20. The transmission grating 31 receives on-axis light and diffracts it into an off-axis angle. Then, the off-axis light encounters three layers of holographic lenslets of the holographic color filter 20 that diffract the light back on axis. The holographic red/green/blue filter 30 works best with white light having a narrow angular blur (less than +1 degree, for example) within the plane of incidence of the hologram layers of the off-axis holographic filter 20, which is a plane defined by the normal to the hologram fringe and the normal to the hologram surface.

The holographic color filter 20 is disposed on an input surface of an optically-transmissive substrate 23. Red, green, and blue components of the white light are focused by three layers (R, B, G) of the holographic color filter 20 into separate spatial locations corresponding to red, green, and blue information-containing pixels of a liquid crystal display layer 22 disposed on an output surface of the substrate 23. A plurality of louvers 24 are disposed within the substrate 23 that help to confine the red, green, and blue components of the white light to predetermined pixel locations of the liquid crystal display layer 22. An optional fiber optic faceplate 25 covers the liquid crystal display layer. The red, green, and blue components of the light are projected from an outer surface of the fiber optic faceplate for viewing by an observer. Complete details regarding the construction of the present display 10 may be obtained from reading of U.S. Pat. No. 4,807,978.

The off-axis transmission grating 31 is designed to be relatively thin, having a thickness on the order of from one to five microns, and to have high index modulation (0.04–0.15) to maximize the spectral bandwidth of the holographic red/green/blue filter 30. The result is that a high percentage of the incident white light from the projector 21 is diffracted into the off-axis direction by the transmission grating 31 where it is re-diffracted on-axis by the three layers of holographic lenslets of the off-axis triple-layer holographic color filter 20.

Figure 1:
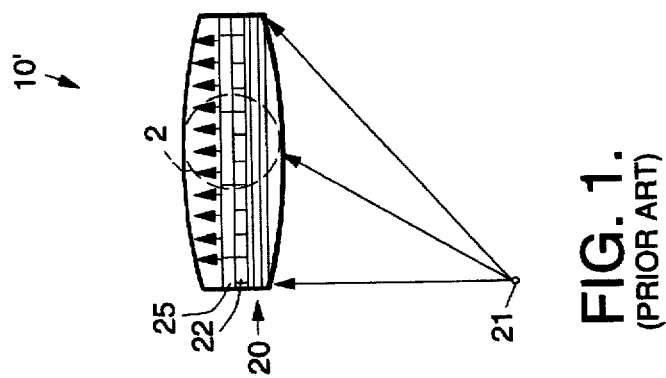
FIG. 1 illustrates a cross sectional view of a prior art liquid crystal display employing an off-axis filter in accordance with the teachings of U.S. Pat. No. 4,807,978.
Figure 4:
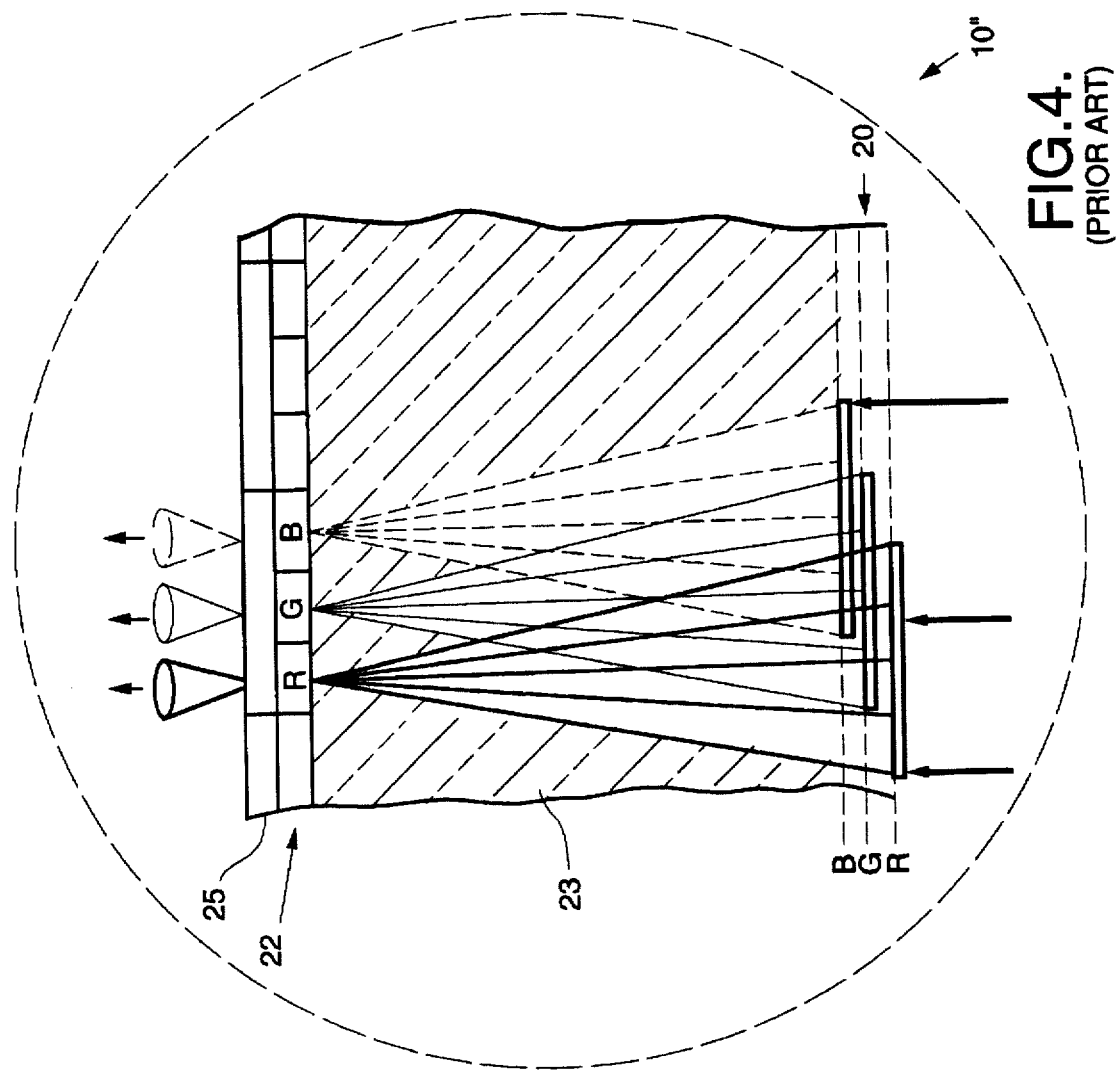
FIG. 4 is an enlarged view of the encircled portion of the liquid crystal display of FIG. 3.
Figure 3:
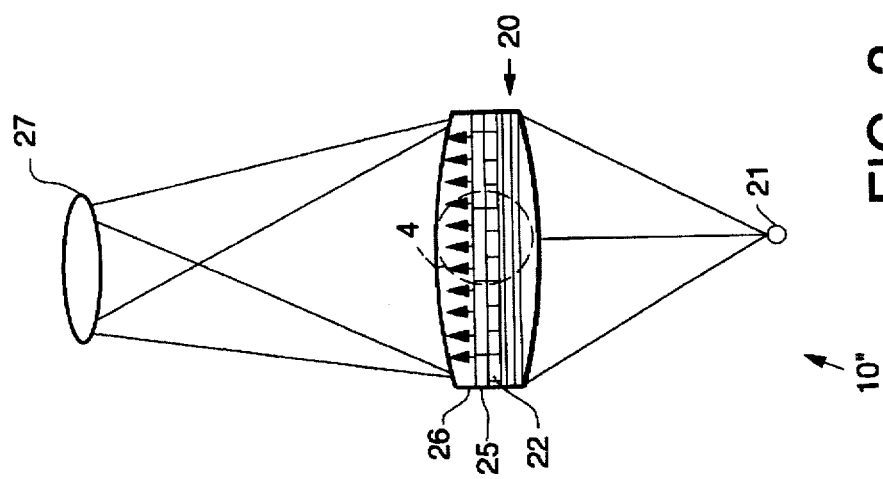
FIG. 3 is a cross sectional view of a prior art liquid crystal display employing an on-axis filter in accordance with the teachings of U.S. Pat. No. 4,807,978.

The main advantage of the present invention over conventional red/green/blue absorptive filters is its near-100% efficiency. The key advantages of the present invention over the holographic filters disclosed in U.S. Pat. No. 4,807,978 are its ability to use on-axis white light illumination while producing a high color purity display, and the first layer, comprising the volume transmission grating 31, causes color dispersion in the diffracted light which compensates for the color dispersion of the triple-layer holographic lenslets of the off-axis triple-layer holographic color filter 20, thus diffracting the light back on axis. The two dispersions cancel, creating a pattern of focused light on the pixel array of the liquid crystal display layer 22 that has much less color blur than is produced by the off-axis embodiment of U.S. Pat. No. 4,807,978 shown in FIGS. 1 and 2. Consequently, the present display 10 has greater color purity.

Thus, an on-axis holographic color filter and full-color liquid crystal display using the improved color filter have been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A liquid crystal display comprising:

a white light source for producing collimated white light;

an optically-transmissive substrate;

a holographic red/green/blue filter disposed on an input surface of the substrate that comprises an off-axis holographic color filter comprising red, green and blue hologram layers for diffracting red, green and blue light, respectively, and an off-axis volume transmission grating disposed on an input surface of the off-axis holographic filter;

a liquid crystal display layer disposed on an output surface of the substrate; and wherein the transmission grating receives incident on-axis light from the white light source and diffracts it into an off-axis angle that is re-diffracted by three layers of holographic lenslets of the holographic color filter back on axis.

2. The display of claim 1 further comprising a plurality of louvers disposed within the substrate for confining the red, green, and blue components of the white light to predetermined pixel locations of the liquid crystal display layer.

3. The display of claim 1 wherein the white light source provides white light having a narrow angular blur within a plane of incidence of the hologram layers of the off-axis holographic filter, defined by a normal to a hologram fringe and a normal to a surface of the hologram layer.

4. The display of claim 3 wherein the white light has a blur of less than ±1 degrees.

5. The display of claim 1 further comprising a fiber optic faceplate disposed on an output surface of the liquid crystal display layer.

6. A liquid crystal display comprising a white light source for producing collimated white light, an optically-transmissive substrate, and a liquid crystal display layer disposed on an output surface of the substrate, wherein the improvement comprises:

an on-axis holographic color filter disposed on an input surface of the substrate that comprises an off-axis holographic color filter comprising red, green and blue hologram layers for diffracting red, green and blue light, respectively, and an off-axis volume transmission grating disposed on an input surface of the off-axis holographic filter; and wherein the transmission grating receives incident on-axis light from the white light source and diffracts it into an off-axis angle that is m-diffracted by three layers of holographic lenslets of the holographic color filter back on axis.

7. The display of claim 6 further comprising a plurality of louvers disposed within the substrate for confining the red, green, and blue components of the white light to predetermined pixel locations of the liquid crystal display layer.

8. The display of claim 6 wherein the white light source provides white light having a narrow angular blur within a plane of incidence of the hologram layers of the off-axis holographic filter, defined by a normal to a hologram fringe and a normal to a surface of the hologram layer.

9. The display of claim 8 wherein the white light has a blur of less than ±1 degrees.

10. The display of claim 1 further comprising a fiber optic faceplate disposed on an output surface of the liquid crystal display layer.

* * * * *